Jan. 18, 1944.    E. ANDERSON    2,339,666

CONTROL MECHANISM FOR DAMPERS

Filed Oct. 1, 1941

Inventor
EVALD ANDERSON

Attorney

Patented Jan. 18, 1944

2,339,666

UNITED STATES PATENT OFFICE 2,339,666

CONTROL MECHANISM FOR DAMPERS

Evald Anderson, North Quincy, Mass.

Application October 1, 1941, Serial No. 413,203

1 Claim. (Cl. 74—527)

This invention relates generally to dampers, and more particularly to a damper and handle for operating the same including means for holding the damper positively in any adjusted or regulated position.

The device is especially adapted for use in connection with ventilating pipes of ships wherein strong attachment, accurate adjustment and stabilization of the damper is of prime importance due to the movement of ships, often under conditions tending to interfere with and upset damper adjustment with consequent failure of proper ventilation.

In view of the uses to which the damper is put, the primary object of the invention is to provide a strong and durable device, and one that may be readily attached, firmly secured to the pipe, and one that may be readily adjusted and maintained in the adjusted position, regardless of the exacting conditions under which it is used.

In the drawing illustrating the invention—

Figure 1:
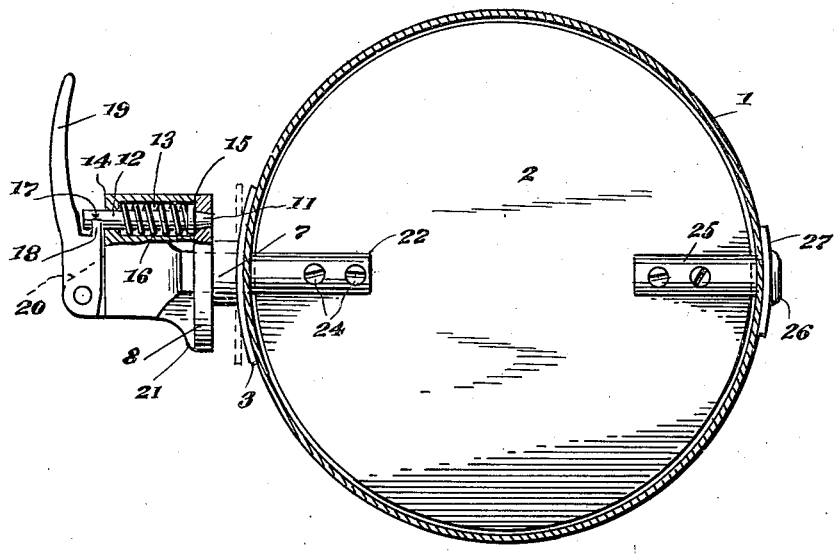
Figure 1 is a section of the pipe with the damper and handle attached.
Figure 4:
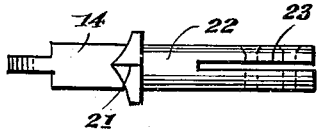
Figure 4 is a detail side elevation of the handle supporting and damper carrying element.

Referring to the drawing, the numeral 1 designates the pipe and 2 the damper proper, which, while fitting the pipe snugly, has sufficient clearance to be rotated or turned for the purpose of adjustment. The numeral 3 designates a plate generally rectangular in form and provided at its corners with apertures 4 for the passage of rivets or other suitable means by which it is attached to the pipe. This plate is normally flat as shown in dotted lines in Figure 1 and adapted to be bent to conform to the outer periphery of the pipe, as shown, the construction being such that a plate of given size may be bent to fit pipes of varying diameters. Preferably the plate is cut out at opposite sides as indicated at 5, so as to facilitate bending in attaching it to the pipe.

Figure 2:
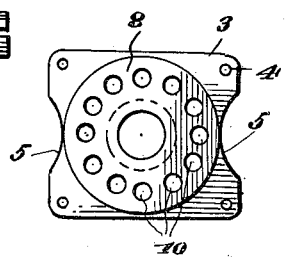
Figure 2 is a transverse sectional view of the lock disk, boss and attaching plate.

As shown best in Figure 2, this plate has a central aperture which receives the reduced portion 6 of the boss 7 integral with the lock disk 8 which is provided with an aperture 9 of the same size as the aperture 6. The preferred mode of attaching the boss to the attaching plate 3 is by welding the reduced portion of the boss within said plate.

Figure 5:
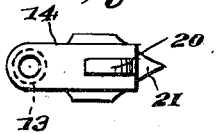
Figure 5 is a top plan view of the part shown in Figure 4.
Figure 6:
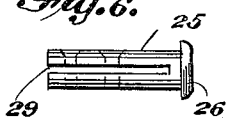
Figure 6 is a detail of the slotted pivot carried by the side of the damper opposite the handle.
Figure 3:
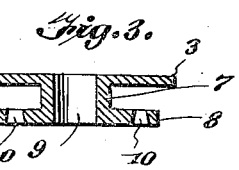
Figure 3 is a top plan view of the lock disk and attaching plate.
Figure 7:
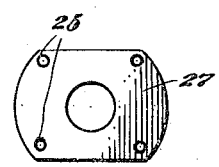
Figure 7 is a detail view of one of the damper supporting members.

Circularly arranged within the lock are holes 10, one or another of which is entered by the tapered end 11 of the lock pin 12 which works in a socket 13 in the handle supporting member 14. This lock pin has near its lower end a flange 15 between which and a shoulder in the socket is interposed a coil spring 16 constantly urging lock pin downward and in position to enter an apertured hole 10 in the lock disk when the handle is manipulated. The socket in which the pin works and in which the spring is contained is preferably open at its lower end so that the spring may be readily inserted with the pin. The upper end of the pin is provided with a recess 17 for the reception of the lateral projection 18 of the handle 19 pivoted to an ear 20 on the handle supporting member 14. This member, as best shown in the detail Figure 5, is generally oblong in shape and much narrower than the lock disk 8, so that when the member 14 is manipulated to adjust the damper, the pointer 21 which is a part of said member, may be visibly positioned on the disk to indicate the exact angle of adjustment of the damper within the pipe, it being understood that the lock disk will be, or may be provided with suitable calibrations which with the pointer will indicate the exact adjusted position of the damper.

As a part of the member 14, there is a shank 22 which extends through the lock plate, boss and attaching plate and into the pipe, the shank being provided with a saw slot or kerf 23 that embraces the damper and registering perforations for the passage of screws 24 by which the damper is secured to the shank.

Diametrically opposite the point of attachment to the damper is a pivot pin 25 provided with a flat head 26 which abuts against a plate 27 somewhat like the plate 3, but smaller, and which, like said plate, has holes 25 in its corners for the passage of rivets or other means by which the plate is secured to the pipe. This plate 27 is, like the larger plate on the opposite side of the pipe, normally flat and adapted to be bent to conform to the outer contour of the pipe, and to be so bent as to fit different sizes of pipes. The pin has a slot 29 to embrace the damper and perforations 30 for the passage of screws for attaching the pin to the damper. To adjust the damper, the handle is raised against the pressure of the spring 16 and released at the proper time to permit the tapered end of the lock pin to enter an apertured hole in the lock plate to hold the damper in adjusted position.

I claim:

In a device of the class described adapted to be mounted on a housing, a plate adapted to be secured to said housing, a boss carried by the plate, a disk integral with the outer end of the boss and having a plurality of circularly alined holes therein, a handle supporting member including a shank extending through the disk, boss and plate for rotatable movement therein, said handle supporting member having a socket therein parallel to its longitudinal axis, a pin in the socket having a flange on its inner end, the outer end of the pin extending from the socket and having a recess therein, a spring encircling the pin and having one end engaged with the outer end wall of the socket and its inner end with the flange, said spring serving to normally urge the inner end of the pin into a selected hole of the disk, an operating handle pivoted to the handle supporting member and overhanging the extended end of the pin, said handle member having a projection intermediate its ends and engageable in said recess and serving to move the pin inwardly against the tension of the spring upon rocking the operating handle in one direction to move the inner end of the pin from engagement with a selected hole of the disk.

EVALD ANDERSON.